(No Model.)
J. WILKINS.
Apparatus for Saving Float Gold.
No. 231,205. Patented Aug. 17, 1880.
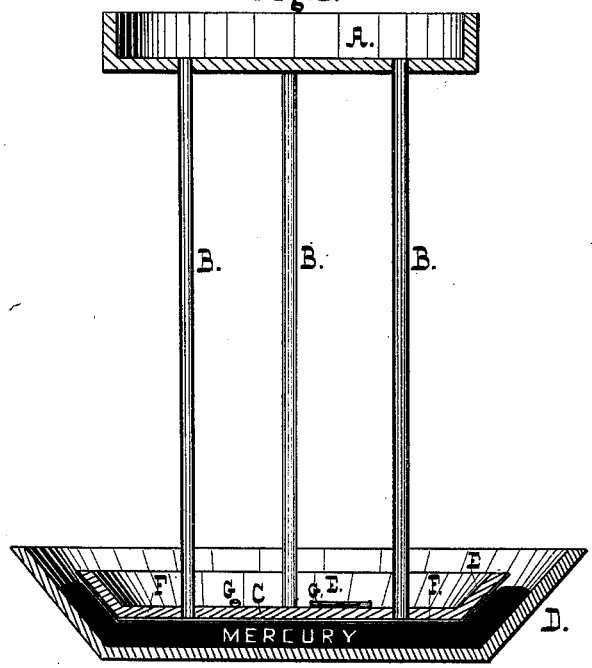
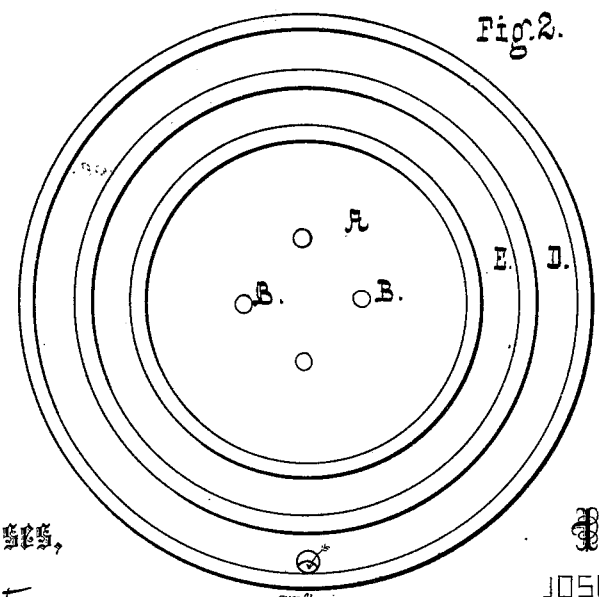
Witnesses,
W. A. Bertram
Geo. H. Barclay
Inventor,
JOSEPH WILKINS.
by
A. D. Williams
Attorney.

UNITED STATES PATENT OFFICE.

JOSEPH WILKINS, OF BALTIMORE, MARYLAND.

APPARATUS FOR SAVING FLOAT-GOLD.

SPECIFICATION forming part of Letters Patent No. 231,205, dated August 17, 1880.

Application filed April 23, 1880. (No model.)

*To all whom it may concern:*

Be it known that I, JOSEPH WILKINS, of Baltimore, State of Maryland, have invented certain new and useful Improvements in Apparatus for Saving Float-Gold; and I hereby declare the same to be fully, clearly, and exactly described as follows, reference being had to the accompanying drawings, in which is illustrated, in plan and section, the device employed by me and constituting my invention.

My present invention consists in certain improvements upon that for which Letters Patent were granted me February 10, 1880, No. 224,368. It is well known that the actual product of metal in metallurgical operations on a commercial scale falls far short of the theoretical return, as shown by analysis or assay, and this loss in the case of gold-mining is probably heavier than in the treatment of any other metal. The sediment which falls from the water flowing from the stamps and from the waste water in hydraulic mining is rich in gold; but all attempts to reclaim and recover this so-called "float-gold" have, prior to my inventions, failed of being practically remunerative.

Inasmuch as the amount of gold suspended in the water bears such a small proportion to the total amount of suspended matter, it would not pay to treat the latter by amalgamation even were a system of filtration or other separation of the suspended matter from the water feasible. The separation of the gold by amalgamation while suspended in the water has not heretofore been practicable, by reason of the obstacles in the way of bringing the water into intimate mixture or contact with mercury. These obstacles I have overcome by means of the simple apparatus described in the above-mentioned Letters Patent.

In the accompanying drawings, in which Figure 1 is a central sectional view, and Fig. 2 a plan, of the device, A is a pan, constructed of any suitable material, from the bottom of which lead pipes B B, the lower ends of which are secured to a disk, C, having perforations opposite the ends of the pipes. D is a second pan beneath the disk C. The disk C has a circumferential inclined flange, E, and its lower face and flange are covered with an amalgamated copper sheet, F.

In operation the water to be treated is led into a tank wherein the sand and heavier particles of dirt and impurities are allowed to subside. The "float-gold," which is all that its name implies, as it remains suspended for an almost indefinite period, remains in the water, which, when reasonably free from impurities, is led into the pan A. Previous to this the pan D has been nearly filled with mercury, the disk C, which is maintained truly horizontal, as shown by a pair of levels, G G, being immersed to the depth of, say, three or four inches, whereby an upward pressure of about two pounds to the inch is secured on its lower face. The pipes B are made of a length to admit of the downward flow of the water—say from eighteen to twenty times the mercuric head—the specific gravities of water and mercury being to each other, respectively, about as one to fourteen. The water from the pan A flows downward through the pipes B and out under the disk C. Instead of assuming the form of spherical masses and bubbling swiftly to the surface, as it would do were the pipes simply immersed in the mercury without the disk, the water spreads itself into a thin sheet under the disk, whereby every part of it is brought into contact with mercury, and any suspended gold is amalgamated and retained. The water flowing from the pan D may be led into the upper pan, A, of a second amalgamator, and thence to a third. The gold is reclaimed from the mercury by the usual methods of squeezing the mass of mercury through fine cloth and distilling the residual mercury from the pasty mass. With careful management there is little or no waste of mercury. It will be seen that the auriferous water is thus caused to pass under pressure between the amalgamated copper facing of the disk and the mercury bath below, being thereby subjected to the amalgamating action in both sides.

The flange F subserves an important end. By it any desired head of mercury is secured without the necessity of filling the pan D, since the pressure on the under side of the disk will be in proportion to the difference in level between the lower face of the disk and the upper surface of the mercury between the flange E and pan D. The flange may be vertical or inclined, but the described arrangement is preferred.

I am aware that it is not new, broadly, to separate gold from auriferous ore by passing the ore under a plate or disk submerged in mercury, and such I do not claim.

What I claim is—

1. In an apparatus for saving float-gold by amalgamation, an elevated tank or receiver, in combination with one or more pipes leading therefrom to a mercury bath, and terminating in a disk or plate having a peripheral flange on its upper side and an amalgamated sheet on its under side, as and for the purpose set forth.

2. The combination, substantially as set forth, of the elevated tank and mercury-vessel and pipes B with the disk or plate C, having an amalgamated sheet on its under side, as set forth.

JOS. WILKINS.

Witnesses:
R. D. WILLIAMS,
JNO. T. MADDOX.